(12) United States Patent
Rylov et al.

(10) Patent No.: US 9,772,995 B2
(45) Date of Patent: Sep. 26, 2017

(54) FINDING AN APPROPRIATE MEANING OF AN ENTRY IN A TEXT

(71) Applicant: ABBYY Development LLC, Moscow (RU)

(72) Inventors: Alexander Gennadievich Rylov, Moscow (RU); Ivan Sergeevich Arkhipov, Moscow Region (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 0 days.

(21) Appl. No.: 14/654,749

(22) PCT Filed: Dec. 24, 2013

(86) PCT No.: PCT/RU2013/001161
§ 371 (c)(1),
(2) Date: Jun. 22, 2015

(87) PCT Pub. No.: WO2014/104943
PCT Pub. Date: Jul. 3, 2014

(65) Prior Publication Data
US 2015/0331852 A1 Nov. 19, 2015

Related U.S. Application Data

(63) Continuation-in-part of application No. 13/728,885, filed on Dec. 27, 2012.

(51) Int. Cl.
*G06F 17/27* (2006.01)
*G06F 17/21* (2006.01)

(52) U.S. Cl.
CPC .......... *G06F 17/2785* (2013.01); *G06F 17/21* (2013.01); *G06F 17/271* (2013.01); *G06F 17/2735* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 5,424,947 A * 6/1995 Nagao .................. G06F 17/271
704/10
5,675,819 A * 10/1997 Schuetze ........... G06F 17/30675
704/10
(Continued)

FOREIGN PATENT DOCUMENTS

JP   2004062726   2/2004
RU   2335800 C2   9/2004
(Continued)

OTHER PUBLICATIONS

English Translation of JP 2004062726 Claims and Detailed Description.
(Continued)

*Primary Examiner* — Lamont Spooner
(74) *Attorney, Agent, or Firm* — Lowenstein Sandler LLP

(57) ABSTRACT

Disclosed are systems, computer-readable mediums, and methods for providing a meaning of an entry in a text is described. A lexico-morphological analysis is performed on the text. A syntactical analysis is performed on the text. A semantic analysis is performed on the text. A syntactical structure and a semantic structure for the entry is chosen. One or more syntactic links between each alternative meaning of words in proximity to the entry is determined. A weight is determined. One or more semantic links between each word in proximity to the entry are determined. For each semantic link, a weight associated with each semantic link
(Continued)

is determined; and based on the weights associated with each semantic and syntactic link, determining meaning of the entry.

25 Claims, 11 Drawing Sheets

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .......................................................... 704/1–9
See application file for complete search history.

(56) References Cited

U.S. PATENT DOCUMENTS

| | | | | |
|---|---|---|---|---|
| 5,918,236 | A * | 6/1999 | Wical | G06F 17/274 704/1 |
| 6,098,034 | A * | 8/2000 | Razin | G06F 17/22 704/9 |
| 6,393,389 | B1 | 5/2002 | Chanod et al. | |
| 7,089,236 | B1 | 8/2006 | Stibel | |
| 7,681,147 | B2 * | 3/2010 | Richardson-Bunbury | G06F 17/278 704/9 |
| 8,078,450 | B2 * | 12/2011 | Anisimovich | G06F 17/2755 704/2 |
| 2004/0024739 | A1 * | 2/2004 | Copperman | G06F 17/30616 |
| 2004/0125124 | A1 | 7/2004 | Kim et al. | |
| 2004/0162806 | A1 * | 8/2004 | Liu | G06F 17/2211 |
| 2005/0080613 | A1 | 4/2005 | Colledge et al. | |
| 2005/0154690 | A1 * | 7/2005 | Nitta | G06F 17/3061 706/46 |
| 2005/0165600 | A1 * | 7/2005 | Kasravi | G06F 17/2211 704/9 |
| 2007/0011005 | A1 * | 1/2007 | Morrison | G09B 17/003 704/231 |
| 2007/0073748 | A1 | 3/2007 | Barney | |
| 2007/0130112 | A1 * | 6/2007 | Lin | G06F 17/3002 |
| 2008/0091405 | A1 * | 4/2008 | Anisimovich | G06F 17/2755 704/4 |
| 2008/0195375 | A1 * | 8/2008 | Clifton | G06F 17/2872 704/4 |
| 2008/0195601 | A1 * | 8/2008 | Ntoulas | G06F 17/30622 |
| 2008/0275694 | A1 | 11/2008 | Varone | |
| 2009/0055381 | A1 * | 2/2009 | Wu | G06F 17/2745 |
| 2009/0327264 | A1 * | 12/2009 | Yu | G06F 17/30864 |
| 2010/0169076 | A1 | 7/2010 | Sproat et al. | |
| 2010/0205541 | A1 * | 8/2010 | Rapaport | G06Q 10/10 715/753 |
| 2010/0235313 | A1 * | 9/2010 | Rea | G06F 17/30265 706/52 |
| 2010/0265250 | A1 | 10/2010 | Koenig et al. | |
| 2011/0078167 | A1 * | 3/2011 | Sundaresan | G06F 17/2785 707/765 |
| 2011/0106743 | A1 * | 5/2011 | Duchon | G06F 17/30705 706/46 |
| 2011/0107206 | A1 * | 5/2011 | Walsh | G06F 17/2785 715/256 |
| 2011/0196821 | A1 | 8/2011 | Hellerman et al. | |
| 2012/0239378 | A1 * | 9/2012 | Parfentieva | G06F 17/2881 704/4 |
| 2013/0211819 | A1 * | 8/2013 | Kagan | G06F 17/2818 704/3 |
| 2013/0304455 | A1 * | 11/2013 | O'Sullivan | G06F 17/241 704/9 |

FOREIGN PATENT DOCUMENTS

| | | |
|---|---|---|
| RU | 2008142648 A1 | 5/2010 |
| RU | 2392660 C2 | 6/2010 |
| WO | 2008/094215 A1 | 8/2008 |
| WO | WO2008/094215 A1 | 8/2008 |

OTHER PUBLICATIONS

International Search Report for PCT/RU2013/001161, dated May 15, 2014, pp. 2.

* cited by examiner

101

A Inflected Forms  M Find In Entry file

I

1.
*noun*
1) a folder or box for holding loose papers together and in order for easy reference
   a file of correspondence
■ a collection of information about a particular person or thing
   MI5 were keeping a file on him
■ *Computing* a collection of data, programs, etc. stored in a computer's memory or on a storage device under a single identifying name
   you can save the file to your hard disk
2) *Canadian* a number of issues and responsibilities relating to a particular policy area
   what progress has the Prime Minister made on the unity file?
2.
*verb* [with obj.] place (a document) in a cabinet, box, or folder in a particular order
   the contract, when signed, is filed | *figurative* he still had the moment filed away in his memory
■ submit (a legal document, application, or charge) to be placed on record by the appropriate authority
   criminal charges were filed against the firm | [no obj.] the company had filed for bankruptcy
■ (of a reporter) send (a story) to a newspaper or news organization
3.
   - on file
Derivatives:
filer *noun*
Origin:
   late Middle English (as a verb meaning 'string documents on a thread or wire to keep them in order'): from French *filer* 'to string', *fil* 'a thread', both from Latin *filum* 'a thread'. Compare with file II

103

II

1.
*noun* a line of people or things one behind another
   files of tourists stream up the narrow lanes of Mont St Michel
■ *Military* a small detachment of men
   a file of English soldiers had ridden out from Perth
■ *Chess* each of the eight rows of eight squares on a chessboard running away from the player towards the opponent. Compare with rank I (in sense 2)
2.
*verb* [no obj., with adverbial of direction] (of a group of people) walk one behind the other, typically in an orderly and solemn manner
   the mourners filed into the church
Origin:
   late 16th cent.: from French *file*, from *filer* 'to string'

105

III

1.
*noun* a tool with a roughened surface or surfaces, typically of steel, used for smoothing or shaping a hard material
2.
*verb* [with obj.] smooth or shape with a file
   never file your nails from the centre to the sides
■ (file something away/off) remove something by grinding it off with a file
Derivatives:
filer *noun*
Origin:
   Old English *fíl*, of West Germanic origin: related to Dutch *vijl* and German *Feile*

*FIG. 1A*

Tree

1.

noun 1) a woody perennial plant, typically having a single stem or trunk growing to a considerable height and bearing lateral branches at some distance from the ground

- (in general use) any bush, shrub, or herbaceous plant with a tall erect stem, e.g. a banana plant 2) a wooden structure or part of a structure

- archaic or literally the cross on which Christ was crucified
- archaic a gibbet 3) a thing that has a branching structure resembling that of a tree

- (also tree diagram) a diagram with a structure of branching connecting lines, representing different processes and relationships

FIG. 2A

Sciences
- Natural sciences
  ○ Astronomy
  ○ Cosmology
  ○ Medicine
    ■ Biochemistry
    ■ Anatomy
    ■ ...
- Technical sciences ⁓⁓ 352
  ○ Mathematics
    ■ ...
  ○ Physics ⁓⁓ 354
    ■ General physics
    ■ Relativistic physics ⁓⁓ 356
    ■ Mathematical physics
    ■ ...
  ○ Chemistry
    ■ Organic
    ■ Inorganic
    ■ Colloid
    ■ ...
  ○ Electrical engineering
  ○ Heat engineering
  ○ ...
- Social sciences
  ○ Sociology
  ○ Political science
○ ...
- Humanities
  ○ Pedagogics
  ○ Psychology
  ○ Heuristics
  ○ Law
  ○ ...

FIG. 3B

1) receive ( ), get ( ), be given ←——480a

<link type="word" pointAt="letters" weight="0.85">
　　　482　　　　486　　　484

<link type = "word" pointAt="prize" weight="O.65">

<link type = "word" pointAt="year in jail" weight="O.25">

2) obtain ( ) ←——480b

<link type = "word" pointAt="right" weight="O.9">

<link type = "word" pointAt="letters" weight="O.75">

3) earn ( ), make ( ) ←——480c

<link type = "word" pointAt="money" weight="O.75">

4) obtain ( ), get ( ) ←——480d

<link type = "word" pointAt="coke" weight="0.25"><!-from coal->

5) get ( ), catch ( ), contract ( ) ←——480e

<link type = "word" pointAt="coke" weight="O.25"><!-from coal->

FIG. 4B

FINDING AN APPROPRIATE MEANING OF AN ENTRY IN A TEXT

CROSS REFERENCE TO RELATED APPLICATIONS

This application is the U.S. National Stage of International Application No. PCT/RU2013/001161, filed Dec. 24, 2013, which is a continuation-in-part of U.S. patent application Ser. No. 13/728,885, filed on Dec. 27, 2012, the entire contents of which are hereby incorporated by reference.

BACKGROUND

Tools exist for creating content for electronic and paper dictionaries, compiling dictionaries, glossaries, encyclopedias, and other types of reference materials. These tools may be a part of an electronic dictionary platform, which may include a number of content conversion and dictionary publishing tools that enable the publication of dictionaries in electronic format, on paper, and online. Such tools are useful for lexicographers when they are working on creating a dictionary, and also for users if they want to create dictionaries for publishing or for a private use. The dictionaries created by users may also be located in an internet site for a public use. Online dictionaries can be accessed via a dictionary server or other device or service over an Internet protocol or through some related service.

One goal of an electronic dictionary user may be to find an appropriate translation for a word or expression in text or alternatively an appropriate translation of a word from a source language to a target language. When a dictionary user sees some new or unknown word in a text, he may attempt to look up the word in a dictionary. The user may find not only an appropriate translation for a dictionary entry, but also many variants of translation, examples, synonyms and other information usually included in dictionaries. Some variants of translation, are marked (or labeled), for example, with grammatical labels—verb, noun, etc., stylistic marks (e.g., slang, poetic, archaic)—and also with marks related to the fields or themes of the entry (e.g., computer, chess, medicine).

One of the most challenging tasks for a dictionary producer is to help users find a proper translation and other relevant information about a word or expression.

SUMMARY

Described herein systems, computer-readable mediums, and methods for providing the appropriate meaning of an entry in a text. The method includes the steps of: determining the alternative meanings of an entry and determining words in proximity to the entry. For each word in proximity to the entry, the link between the entry and each word in proximity to the entry is determined and for each link between the entry and each word in proximity to the entry, determining a weight associated with each link. Based on the weight associated with each link, the appropriate meaning of the entry is determined.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 1A shows an example of an entry for "file" in an electronic dictionary.

FIG. 2A shows an example of the entry "tree" that could be viewed by a user of an electronic dictionary.

FIG. 3B shows an incomplete hierarchical tree structure that lists different fields of human knowledge that can be used to identify the themes in accordance with an embodiment of the disclosure.

FIG. 4B shows a dictionary entry and its associated links and weights in accordance with an embodiment or implementation of the disclosure.

Figure 1B:
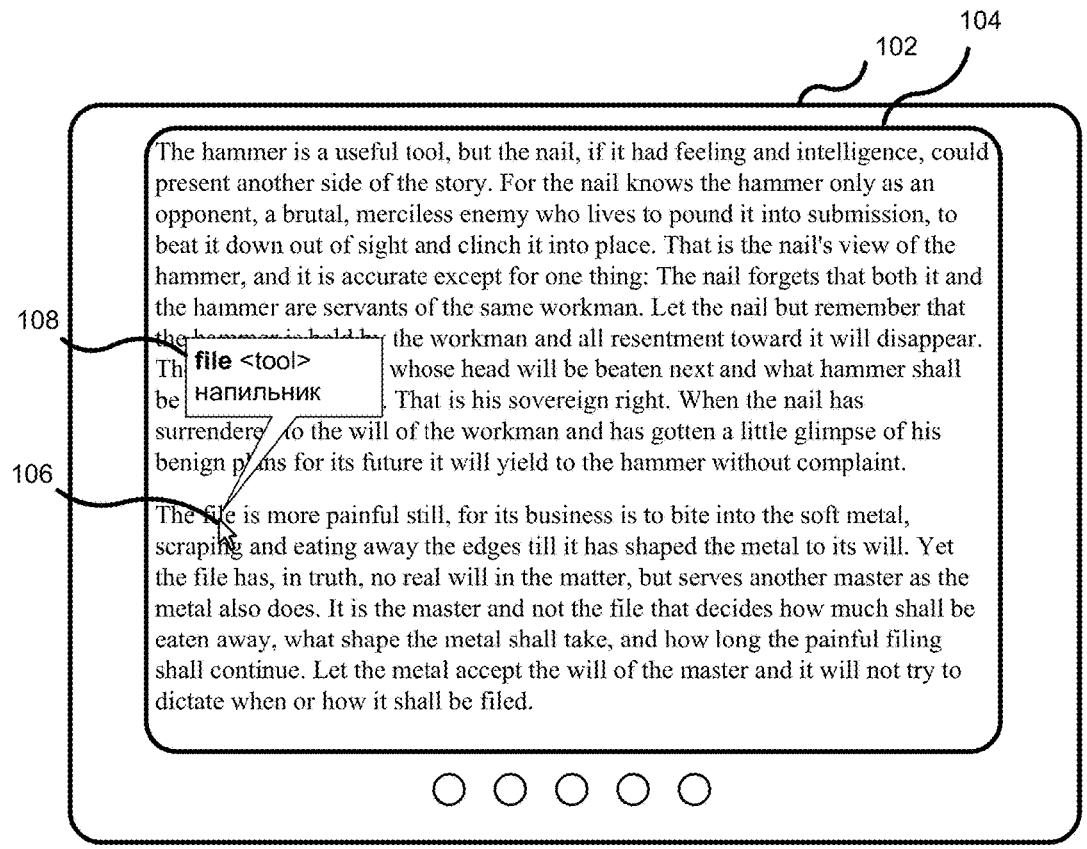
FIG. 1B shows an example of a user interface element displaying an appropriate translation in Russian from a dictionary entry of a word selected by a user on a screen of an electronic device, in accordance with an exemplary embodiment of the disclosure.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Implementations of various disclosed embodiments relate to finding meanings of words in texts including through the use of electronic dictionaries.

Electronic dictionary software assists a user in translating and analyzing text. In an exemplary implementation, a user interface of such dictionary software includes a pop-up translation tool. When a user meets an unknown word in a text, the user can point to the word with a mouse cursor (or touch a screen with a finger). In response, a short translation of the word may appear, for example, in a pop-up window, in a balloon, as a subscript, footnote, endnote, and so forth. If the user clicks on the short translation, he can see a full dictionary entry. A translation function to generate a short or abbreviated entry can help a user save time while reading and translating texts.

To provide variants of translation for a user, the electronic dictionary may have a special markup of meanings which help to assign special meanings to corresponding fields. In this case, it is possible to select a proper variant of the translations if the field (or theme) of the text being translated is known. A lexicographer may insert a special markup manually, or automatically using special dictionary markup software.

Some electronic dictionaries may have a very large number of entries and they may contain a lot of different homonyms and lexical meanings. Consequently, access to the whole entry content, selection of an appropriate meaning, and translation may require a considerable period of computational and actual time when a user translates a word from a text string. If entries of an electronic dictionary are provided by dictionary markup, a user does not receive all variants of translation, but only those variants of translation which correspond to the marked up entries which can greatly reduce access or latency time.

The electronic dictionary may suggest to a user an appropriate lexical meaning for translation among multiple possible meanings of the entry. In addition, the electronic dictionary may collect, analyze and use information about text being translated, about the user, context, history of previous translations made by the user, etc. In one example, selection of the appropriate meaning is dependent upon using the dictionary markup information related to the text in proximity to an entry. In one example, what is considered to be in proximity to the entry can be set by a user or alternatively set by the system as a default value. For example, proximity may be defined as a predefined number of words, sentences, clauses, paragraphs, etc. that are proximate to an entered or selected word or expression. In another example, the user can define the text for which the theme will be determined by highlighting the text of interest. In one example, the text of interest is a portion of the entire text. In another example, the text of interest is the entire text. In one example, the text of interest is highlighted and the user selects the text and makes a request for analysis (pushes the "Analyze" button) in order to determine the theme of the selected text.

In one case, the dictionary markup information is the theme of the text. In this example, the markup theme of the text is used to determine the most appropriate alternative meaning of the entry. The theme of the text being translated may be defined, for example, on the basis of a manual user selection, or alternatively may be defined automatically using a classifying method or any other heuristic or method. Herein, a solution is proposed for markup of dictionaries. The solution adds to dictionary markup the ability to add theme data to meanings of the dictionary entries. When a user is viewing a text and needs to get an appropriate variant of translation for a word (entry) in the text, based on the theme of the text in proximity to the entry, the most appropriate meaning of the entry is determined.

One exemplary method for providing the most appropriate meaning of an entry in a text includes the steps of: determining if there are alternative meanings of the entry in an electronic dictionary; determining the dictionary markup theme associated with each of the alternative meanings of the entry; determining the theme associated with the text; for a hierarchical tree structure associated with themes of entries in the electronic dictionary, comparing the distance between the theme associated with the text and the dictionary markup theme of each of the alternative meanings of the entry; and selecting the most appropriate meaning of the entry. In one example, the tree structure is a semantic tree structure. In one example, the alternative meaning of the entry whose dictionary markup theme is the shortest distance to the theme of the text is selected.

An alternative method may be used to determine the most probable meaning of the dictionary entry. In one example, the alternative method is based on statistics of combinability; the method creates links between words that are used together in the word combinations. One or more weights in accordance with the determined statistics are associated with the links. The statistics may be calculated on the basis of a large corpora of texts. The most probable word meaning of the entry is chosen based upon the weight associated with a particular link. In one implementation, the higher the weight, the higher the probability that the alternative meaning is the most probable meaning of the entry.

In one example, the method of providing the most probable meaning of an entry in the text comprises the steps of: storing link information wherein the link information is based on words used in combination with each other; storing link weight information wherein the link weight information is based on the frequency of the use of each of the linked words in combination with each other; determining any alternative meanings of an entry; determining words in proximity to the entry; for each word in proximity to the entry, determining a link between the entry and each word in proximity to the entry; for each dictionary markup link between the entry and each word in proximity to the entry, determining a weight associated with each link; and based on the weight associated with each link, determining the most probable meaning of the entry.

In one example, the method of determining the most appropriate meaning based on the theme of the text in proximity to the entry (as shown for example in FIG. 3A) and the method of determining the most probable meaning based on links between words used together in word combinations (as shown for example in FIG. 4A) can be used either separately or in combination with each other. In one example where the two methods (the method shown in FIG. 3A and FIG. 4A) are combined, all variants of translations may be estimated taking into account both methods: the method of determining the most appropriate meaning based on the theme of the text in proximity to the entry, and the method of determining the most probable meaning based on links between words. In such case, the strength of each of the variants of alternative meanings is estimated by number. The estimations (numbers) from the two methods may be combined to determine the most appropriate or most probable meaning. The combination of the two methods can strengthen the probability that the meaning selected is the best available meaning or the correct meaning.

When a lexicographer is entering dictionary markup, she may refer or associate headwords and definitions (i.e., meanings) to definite semantic fields and describe their basic syntactic patterns, contexts, examples of usage, word combinations, etc. The availability of such markup makes it possible to examine formal parameters of the context during analysis in order to get an appropriate translation of a word in a text. In one example, an electronic dictionary can analyze the theme of the text, context, basic semantics and grammar patterns for a particular word or phrase. The result of this analysis can be used to determine the most likely meaning from a large dictionary entry when a user seeks a definition for the particular word or phrase.

FIG. 1A shows an example of the entry "file" in an electronic dictionary. With reference to FIG. 1A, the entry has three different homonyms which are designated as Roman numerals—I (101), II (103) and III (105), where, for example, the first homonym has three grammatical values including a noun (1.) and a verb (2.), and several lexical meanings—1) a folder or box; 2) a collection of information; 3) a collection of data, programs, etc. stored in a computer's memory. Meanings 1) and 2) may relate, for example, to topics "office work," "records management," "workflow," and meaning 3) to "computing." The other meanings may have a specific meaning, for example, "Canadian" for "a number of issues and responsibilities relating to a particular policy area."

The second homonym II (103)—"a line of people or things one behind another" —may be general, but if the translated text contains terms related to "military" or "chess," one of these specific meanings should be selected. The third homonym III (105) is very specific, and if the translated text contains terms related to "metalwork," "tools," "instrument," this meaning should be selected.

In one example, the electronic dictionary may select an appropriate lexical meaning for translation based on grammatical, syntactic and/or semantic context. In one example, one or more sentences of the translated text may be used in determining the grammatical, syntactic and/or semantic context.

FIG. 1B shows an example of displaying the most appropriate translation from a dictionary entry of a word selected by a user on a screen 104 of an electronic device 102. The user may select the word, for example, by means of a mouse cursor 106 or by a touch to the electronic device 102 or screen 104. The system displays a correct Russian translation " напильник " (a tool with a roughened surface or surfaces) from an English-Russian dictionary because the lexical meaning is most appropriate for the semantic context. The translation may be shown, for example, in a balloon 108, a tooltip or via other methods, or may be voiced or verbalized.

When searching for a translation of a given word combination, the electronic dictionary analyzes the text theme. Based on the analysis, the software determines (1) which one or more dictionaries should be selected for the translation, (2) which meaning from said dictionaries should be selected for translation and (3) which examples of use should be shown or provided.

FIGS. 1A and 1B show the type of information that can be read and easily understood by a user of the dictionary. Dictionary markup is information that specifies the features of a part of a dictionary entry. Dictionary markup lets the computer understand some additional part of the information that is not located in the dictionary entry (or part of it) but that can be easily understood by a human. For example, marking the dictionary word entry "scalpel" with a theme label "medicine" will let a computer understand that the word is connected with medical themes.

Dictionary Markup of Theme

Figure 2B:
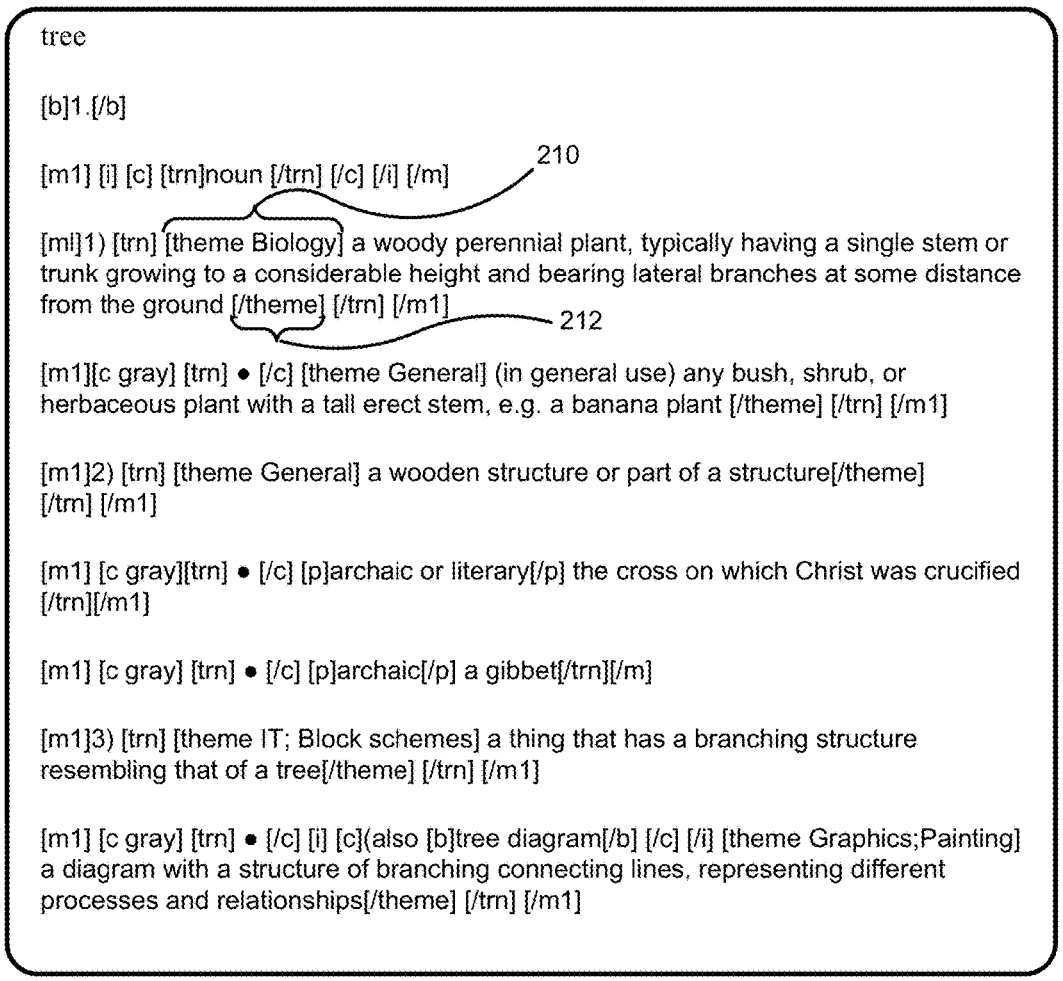
FIG. 2B shows an example of a computer readable dictionary entry associated with the entry "tree" that shows the addition of a dictionary markup theme feature in accordance with an exemplary embodiment of the disclosure.

As previously stated, dictionary markup is used in one case to markup the dictionary with information related to the theme of the definition and this markup information is used to provide the relevant meaning of the word in text. For purposes of example, "tree" is an English-English dictionary article/entry from the Oxford English dictionary. FIG. 2A shows an example of the article/entry "tree" that could be presented to a user of an electronic dictionary. In contrast, the example shown in FIG. 2B shows the technical representation of markup data that is readable and understood by the electronic dictionary software but that is not easily viewable or readable by a human user.

Referring to FIG. 2B, it shows an example of a computer readable representation for a compiler of the dictionary entry associated with the entry "tree" that shows the addition of a dictionary markup theme feature in accordance with an exemplary embodiment or implementation of the present invention. In the example shown in FIG. 2B, the technical representation of markup language is italicized. Further, the technical data includes dictionary markup theme information. In the example shown in FIG. 2B, there are two theme markers—an initial theme marker 210 and a termination theme marker 212. The initialization theme marker 210 includes two words between brackets—the word "theme" and the actual theme of the definition that is between the initial theme marker 210 and the termination theme marker 212 that is marked in the electronic dictionary by the lexicographer. The termination theme marker includes a single word "theme" between brackets. The termination theme marker marks the end of the text in the dictionary associated with the theme.

For the example shown in FIG. 2B, the initialization theme marker 210 includes the word theme and the word "Biology" in brackets. Thus, the theme associated with the meaning "a woody perennial plant, typically having a single stem or trunk growing to a considerable height and bearing lateral branches at some distance from the ground" is Biology.

One way to mark up dictionary entries is to use preliminary training on two text corpora of the same theme. For example, it is possible to train the system on an English text corpus related to information technology (IT), and separately on a Russian text corpus related to IT. Then, the system will "know" that the English word "file" is specific for an IT theme, and the Russian word " файл " in turn is specific for an IT theme in Russian texts. By the same procedure training for other themes is possible. So, based on this information, meanings of dictionary entries may be labeled according to one or more themes. In one example, the different themes that are used for the mark up in the electronic dictionary are arranged in a tree-like structure or list that corresponds to different fields of human knowledge.

FIG. 3B shows an incomplete hierarchical tree structure that lists different fields of human knowledge that can be used to identify the themes. In one example, the concept of "distance" between different fields (leave/nodes of a tree) can be described as a function of a level and a number of tree nodes that have to be visited in order to "reach" the necessary node/leaf. For example, if the Technical Science node 352 is the necessary node to reach, then from the node Relativistic Physics node 356—the Physics node 354 must be visited in order to reach the Technical Science node.

If we want to measure the difference between two or more themes, then the distance between tree leaves may be a good metric. In calculating the distance, an increasing coefficient can be assigned to each higher level. For example, going from a level (n-2) into (n-1), one coefficient unit (c.u.) distance is added. For going from (n-1) into (n-2) one c.u. is added. Such a metric can be entered for three different cases: for going "up," for going "below," and for going either "above" or "below." Such a system allows the ability to correctly distinguish situations where two words are in leaves with a different depth relative to a vertex.

The concept of distance between fields of knowledge is important because when a target word in the text has lexical meanings located in completely different areas of the tree, the concept of distance can be used in determining which alternative meaning will be most relevant to the user. To help determine the most relevant alternative meaning, in one example the system collects information about the text where the entry is found and determines the theme of the text. Then it compares the distance from the theme of the text to the theme of the alternative meanings of the entry. Based on the distance from the theme of the text, the system can determine the most appropriate meaning to the user.

In one embodiment of the present invention, the system may select an appropriate lexical meaning for translating depending on grammatical, syntactic and semantic context that may include one or more sentence of the text being translated. In another embodiment the system may select an appropriate lexical meaning on the basis of dictionary markup.

In one example, semantics associated with the addition of theme data in dictionary markup is the tree structure associated with human knowledge such as is shown for example in FIG. 3C. In another embodiment, markup of lexical meanings in dictionary entries may be provided by establishing links between the lexical meanings and corresponding lexical meanings in the semantic hierarchy described in more detail in U.S. Pat. No. 8,078,450; the contents of this patent are incorporated herein reference in their entirety.

The semantic hierarchy is a hierarchy of semantic classes. The semantic classes are semantic notions (semantic entities) and named semantic classes are arranged into semantic hierarchies—hierarchical parent-child relationships—similar to a tree. In general, a child semantic class inherits most properties of its direct parent and all ancestral semantic classes. For example, semantic class SUBSTANCE is a child of semantic class ENTITY and the parent of semantic classes GAS, LIQUID, METAL, WOOD_MATERIAL, etc.

In one embodiment, semantic classes may be used as dictionary markup themes. In still another embodiment, only specific semantic classes, excluding most abstract or general ones, may be used for dictionary markup. In this case, specific meanings (related to specific fields of knowledge or activities) in the dictionary are marked by corresponding semantic classes or connected with a corresponding semantic class.

The semantic hierarchy is a universal, language-independent structure, and the semantic classes may include lexical meanings of various languages, which have some common semantic properties and may be attributed to the same notion, phenomenon, entity, situation, event, object type, property, action, and so on. Semantic classes may include many lexical meanings of the same language, which differ in some aspects and which are expressed by means of distinguishing semantic characteristics.

Each semantic class in the semantic hierarchy is supplied with a deep model. The deep model of the semantic class is a set of the deep slots, which reflect the semantic roles in various sentences. The deep slots express semantic relationships, including, for example, "agent," "addressee," "instrument," "quantity," etc. A child semantic class inherits and adjusts the deep model of its direct parent semantic class.

The system of semantemes includes language-independent semantic attributes which express not only semantic characteristics but also stylistic, pragmatic and communicative characteristics. Some semantemes can be used to express an atomic meaning which finds a regular grammatical and/or lexical expression in a language. For example, the semantemes may describe specific properties of objects (for example, "being flat" or "being liquid") and are used in the descriptions as restriction for deep slot fillers (for example, for the verbs "face (with)" and "flood," respectively). The other semantemes express the differentiating properties of objects within a single semantic class, for example, in the semantic class HAIRDRESSER the semanteme "RelatedToMen" is assigned to the lexical meaning "barber," unlike other lexical meanings which also belong to this class, such as "hairdresser," "hairstylist," etc.

Lexical meanings may be provided by a pragmatic description which allows the system to assign a corresponding theme, style or genre to texts and objects of the semantic hierarchy. For example, "Economic Policy," "Foreign Policy," "Justice," "Legislation," "Trade," "Finance," etc. Pragmatic properties can also be expressed by semantemes. For example, pragmatic properties may be taken into consideration during the translation words in context of neighboring and surrounding words and sentences.

Each lexical meaning in the lexical-semantic hierarchy has its surface (syntactical) model which includes one or more syntforms as well as idioms and word combinations with the lexical meaning. Syntforms may be considered as "patterns" or "frames" of usage. Every syntform may include one or more surface slots with their linear order description, one or more grammatical values expressed as a set of grammatical characteristics (grammemes), and one or more semantic restrictions on surface slot fillers. Semantic restrictions on surface slot fillers are a set of semantic classes, whose objects can fill this surface slot.

When a lexicographer is creating a dictionary entry, he may directly link each or some lexical meanings with a corresponding lexical meaning in the semantic hierarchy. The connection may not be readily visible to a user of the electronic dictionary, but the lexical meaning in the electronic dictionary will inherit all syntactic and semantic models and descriptions of corresponding lexical meaning in the semantic hierarchy.

Another way to connect meanings in the electronic dictionary with corresponding lexical meaning or semantic class in the semantic hierarchy is to apply the syntactic and semantic analysis. So when the electronic dictionary software tries to find an appropriate lexical meaning for the current word to translate it into another natural language, the system, at first, finds its one or more morphological lemma, and when the system finds more than one lexical meaning corresponding to the lemma, the system analyzes the syntactic, semantic and pragmatic context which may include one or more neighboring and surrounding words or sentences. Then, the system may select an appropriate lexical meaning from the dictionary on the basis of such a context analysis.

Figure 3A:
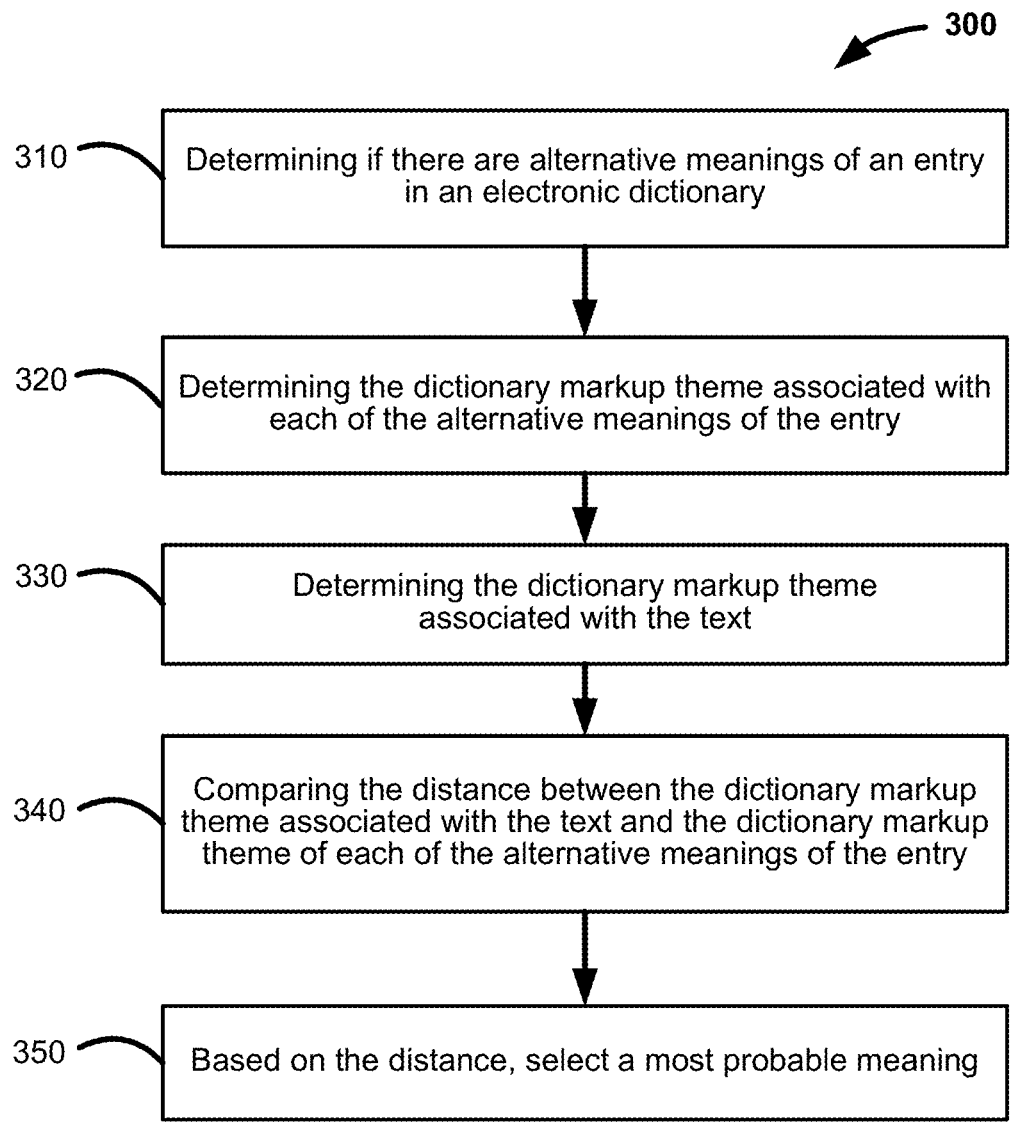
FIG. 3A shows a flowchart of operations performed by a dictionary writing system for determining a word meaning in view of a text theme in accordance with an embodiment of the present disclosure.

Similar to the method described with respect to the tree structure shown in FIG. 3B, for a semantic tree structure the distance from the theme of the previously translated words to the theme of the alternative meanings of the entry is used to determine the most appropriate meaning. FIG. 3A shows a flowchart of operations performed by dictionary software for determining word meaning in view of text theme in accordance with an embodiment or implementation of the present disclosure. Referring to FIG. 3A, it shows a method 300 for providing the most appropriate meaning of an entry in a text. In one example, the method includes the steps of: determining if there are alternative meanings of the entry in an electronic dictionary (step 310); determining the dictionary markup theme associated with each of the alternative meanings of the entry (step 320); determining the theme associated with the text (step 330); for a tree structure associated with entries in the electronic dictionary, comparing the distance between the theme of the text with the dictionary markup theme of the alternative meanings of the entry (step 340); and selecting a best or preferred meaning of the entry, wherein selection is based on the distance between the theme of the text and the dictionary markup theme of the alternative meanings of the entry (step 350).

Step 330 may include statistical or semantic analysis of text (or plurality of words) and determines the subjects or theme of this text (or plurality of words). In one embodiment, methods using classifying texts methods (e.g., a method based on preliminary training) and gathering information about translated words, may be used. As the number of words and word combinations increases (as a translation session continues), the software receives more information, refines the subject field of the text being translated, and offers through a user interface to the user more relevant translation results. The interface of software provides elements on the interface (e.g. button, footnote) that enable the user to start the gathering information about translation session and software elements to reset it. Also, there are different settings to adapt and control the translation process.

In still another embodiment, the text being translated may be entered as a hole to be preliminarily analyzed. For such analyzing, the system may provide lexical, syntactical and semantic analyses. For example, such analyses may be provided by methods described in U.S. Pat. No. 8,078,450 (the subject matter which is hereby incorporated by reference in its entirety). The system includes exhaustive linguistic descriptions to provide all steps of analysis; one of them is the step of lexical selection for each item of a sentence. If the lexical selection is executed in accordance with an illustrative embodiment, a syntactic structure of the sentence may be built and non-tree links may be established. The results of said lexical selection made in the process of analysis may be saved and used as suggestions during translating with use of a particular or selected electronic dictionary. The results of the lexical selection may also be used for collecting statistics about word usage and identifying one or more relevant subject matters.

Then, when a user translates a word or finds the meaning of a new word the electronic dictionary, having information about the current theme suggests the most appropriate meaning. In one example, the most appropriate meaning is based on the theme of the text being translated. In an alternative example, the most probable meaning is found by choosing a dictionary whose subject matches the theme of the text. For example, for text that is found to have a "medical" theme, instead of looking for a meaning that has a medical theme—a specialized dictionary that has a "medical" theme—a medical dictionary, may be used to determine a meaning instead of using a general dictionary.

In one example, conformity to a theme is determining if the theme of the word matches or conforms to the theme in the tree structure. In one example, conformity is checked for each dictionary that a user has at his/her disposal. In another example, conformity is checked for each meaning of a word or word combination. In another example, conformity is checked for each example of word use.

In one example, in order to determine the most appropriate meaning based on information of the word and the theme, the system may first store theme data in the tree structure for comparison. Thus, in one example the analysis of which meaning is the most probable meaning may be preceded by a knowledge training step where data is associated with nodes and leaves of the tree structure of themes of the electronic dictionary. In one example, at the preliminary step, a classifier reviews a large amount of different texts of known subjects (e.g., IT text, medicine text) to analyze and to extract specific lexical features (words), and then the system uses them for defining the subject or theme of the text. For example, the software analyses a large amount of texts each of which is related to IT and a large amount of texts each of which is related to medicine. As a result, the software is programmed to distinguish which words are specific for texts related to IT and which words are specific for texts related to medicine. The procedure is repeated for every theme.

After such preliminary training, when a user starts gathering information during translation session, the system gathers translated words and user-selected translation variants to determine the theme of the text, if it is possible, based on words that may be "specific" for one or another theme.

Dictionary Markup for Word Combinations

As previously stated, dictionary markup is used in one example to markup the dictionary with information related to the theme of the entry. This dictionary markup theme information is used to provide the relevant meaning of the word in text. In a second example, dictionary markup is used to mark the possible existence of stable syntactical relations between words. The "strength" of the connection depends on the word combination popularity and can be used to determine the most probable meaning of the word in the text.

For this purpose a lot of text corpora are processed in such a way, and information about word combinability is collected. In one example, based at least in part on statistics, the frequencies of occurrence of all possible word combinations in some word order, adjoining or within the vicinity of (a small distance (for example, 5-6 words from the entry)) are counted and collected. The frequencies of occurrence of the word combinations which are higher than some threshold value (e.g., 0.5, 0.005) may be taken into account, and corresponding sequences of words are considered as word combinations. On the basis of the frequencies that the word combinations occur, weights of word combinations are determined. In one example, the word combination links and the weights associated with the word combination occurrences are saved in a database. The database can be updated if new portions of text corpora are processed.

In one implementation, having a database with weights for an entry in the dictionary, allows the dictionary system to get a list of words or lexical meanings which are used most frequently in combination with the entry, according to the weight associated with the link. The weight associated with the links describes the degree of frequency that the linked word is used in combination with the entry. When the electronic dictionary attempts to determine the most probable meaning for an entry, the dictionary system captures not only the word, but its proximity to the entry (e.g., within one sentence). All combinations of translations of the entry with translations of captured words are created and the system searches information in the database. If a word combination is found in the database and its rating is high enough, the corresponding lexical meaning may be considered the most probable meaning and the corresponding variant of translation may be selected.

Figure 4A:
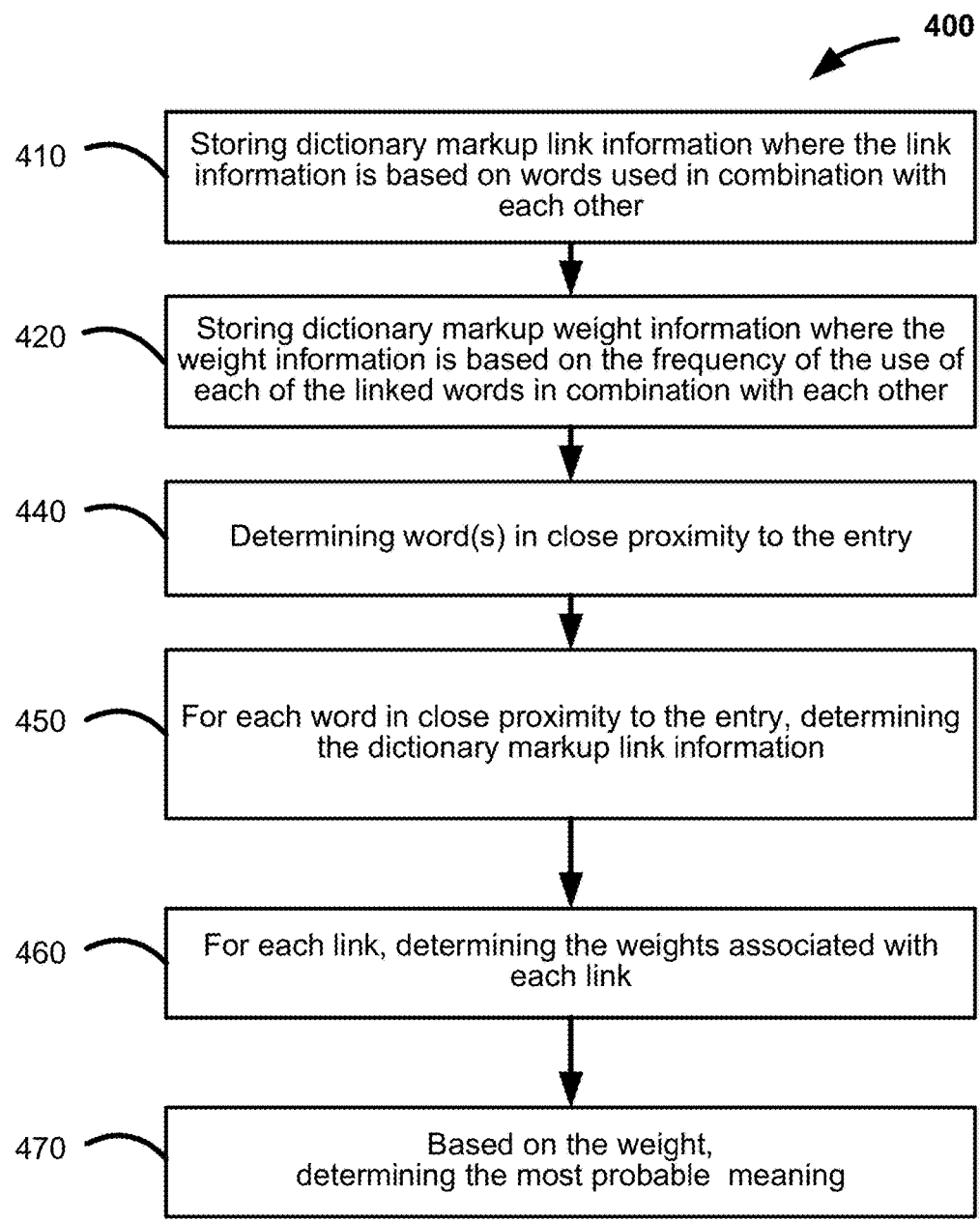
FIG. 4A shows a flowchart of operations for determining word meaning in view of word combination frequency in accordance with an embodiment of the disclosure.

Referring to FIG. 4A, it shows a flowchart of operations performed by dictionary software for determining word meaning in view of the text theme of word combinations in accordance with an alternative embodiment or implementation of the present disclosure. In one example, the method provides the most probable meaning of an entry in text. In one example, the method 400 includes the steps of: determining the alternative meanings of an entry (step 430); determining neighboring words in proximity to the entry (step 440); for each neighboring word in proximity to the entry, determining a link between the entry and each neighboring word in proximity to the entry (step 450); for each dictionary markup link between the entry and each neighboring word in proximity to the entry, determining a weight associated with each link (step 460); and based on the weight associated with each link, determining the probable meaning of the entry (step 470).

Meanings are sought among translations of the neighboring words, which are used frequently with the given word. The weights of the obtained links are analyzed and in one example, the translation with the greatest weight of link is selected from among the many possible translations. Links and their weights may be entered using automated analysis of the corpus of texts in a given language and also using manual markup of dictionaries, involving specialist lexicographers.

Assume for the purposes of example, that a user would like to find an English translation of the following word combination in Russian, "получить большинство впарламенте." Using a hover translation function, a user points at the word "получить" to get its translation into English for example, "receive." The entry "получить" has several possible translations (according to several lexical meanings) in the dictionary:

1) (to take what is suggested, is awarded) receive, get, be given. Examples: receive/get a letter; receive/get a prize; receive an honorary degree; get [be given] a good price for a house; get a year in jail; what newspaper do you take in?

2) (try to) get, obtain. Examples: get the right (for; +to); get a job "получить большинство"—win a majority 3) earn, make. Examples: earn a salary /wage; get [be given] one's pay; how much does he earn/make?, how much is he paid? get a pension 4) (get as a result of a process), obtain, get Examples: obtain coke from coal get/obtain interesting results 5) (be infected with an illness) get, catch, contract. Examples: catch a cold develop pneumonia, etc.

To select the most probable proper lexical meaning and to translate the word "получить" in such combination into English, the system captures also the words "большинство" and "парламент," then obtains their variants of translations, for example, 1) "majority"; 2) "most people" for "большинство," and "parliament" for "парламент," and then all possible combinations (Cartesian product) of words (pairs, triples, et al.): get+majority, receive+majority, . . . catch+majority, . . . catch + parliament, . . . etc. If, for example, the combination "receive+majority" has the best rating in the database, the variant "receive" will be suggested to the user as the best variant of translation for the word "получить" in this context. But, for the combination "получить простуду," the best suggested variant is possibly "catch" because the combination "catch flu" is very frequent.

Figure 4C:
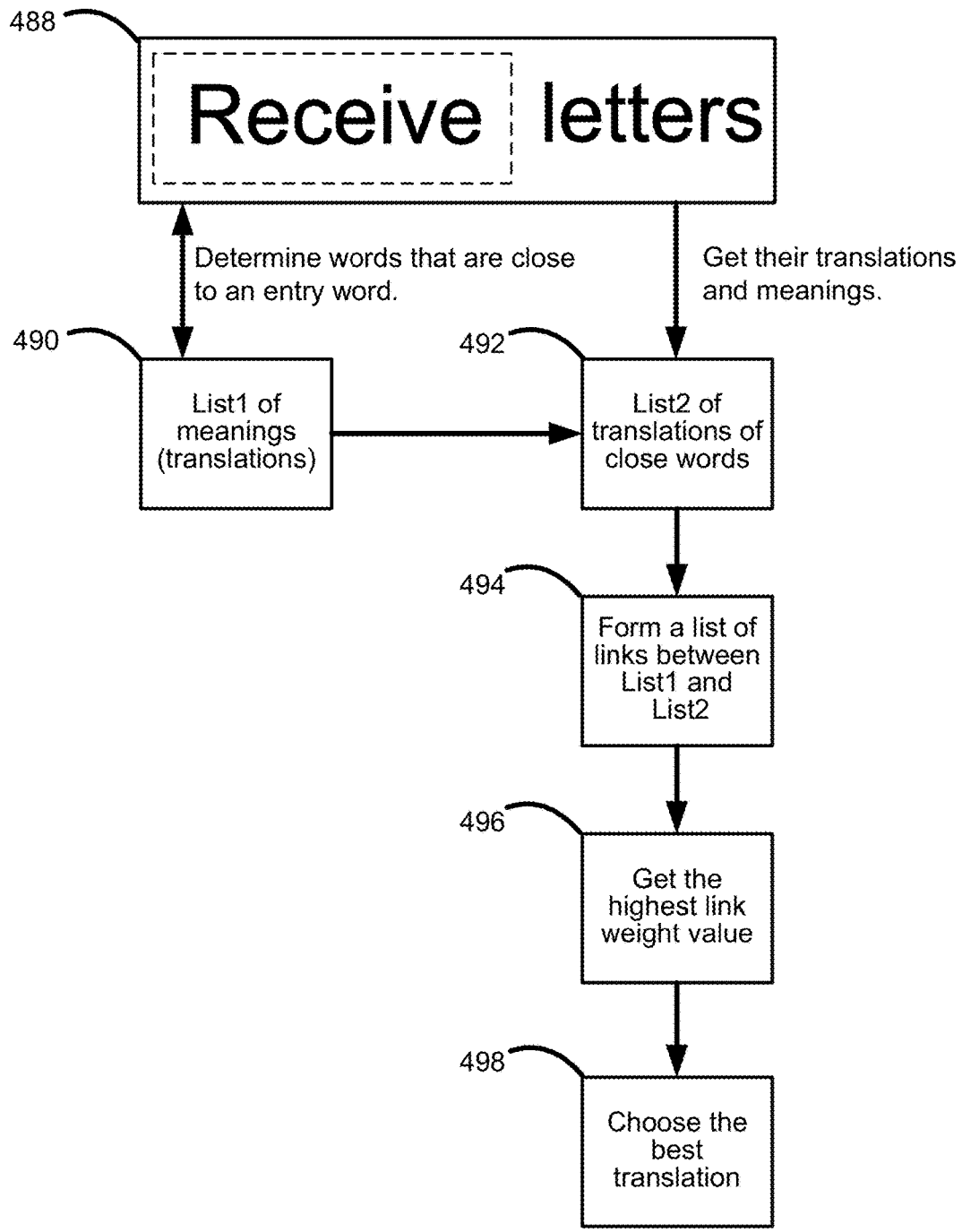
FIG. 4C shows a partial process flow diagram of the method shown in FIG. 4A in accordance with an embodiment of the disclosure.

Referring to FIG. 4B, it shows an example of both link information 482 and weight information 484. FIG. 4C shows a partial process flow diagram of the method shown in FIG. 4A in accordance with an embodiment or implementation of the present disclosure. Referring to FIG. 4C, the process includes determining a List 1 of meanings (490). The List 1 of meanings (490) for word 480a in FIG. 4B would be the word or word combinations receive (direct object), get (direct object), and be given (direct object).

For the example shown in FIG. 4B, the electronic dictionary looks for the translation (490) of the set of words from attribute pointAt. For the List 2 of translation of close words (492) the electronic dictionary finds the translation << письмо письма >> in the entry "letters." From this, a list of links between contents of List 1 and List 2 is formed (494). The list includes two links for a "letter":

<link type = "word" pointAt="letters" weight="0.85">
<link type = "word" pointAt="letters" weight="0.75">

Although there can be one to n links, in the example shown, we have two links with different weights. Then it is possible to compare the weights and decide that a link for "receive" is more probable based on the higher weight of the link. Thus, the user interface shows a translation "receive" for a word "письмε/письмo." If there as only one reference for the word "letter," then the process would be stopped without having to consider the weight and the user interface would show the entry where the link having the single reference originated from.

Figure 5:
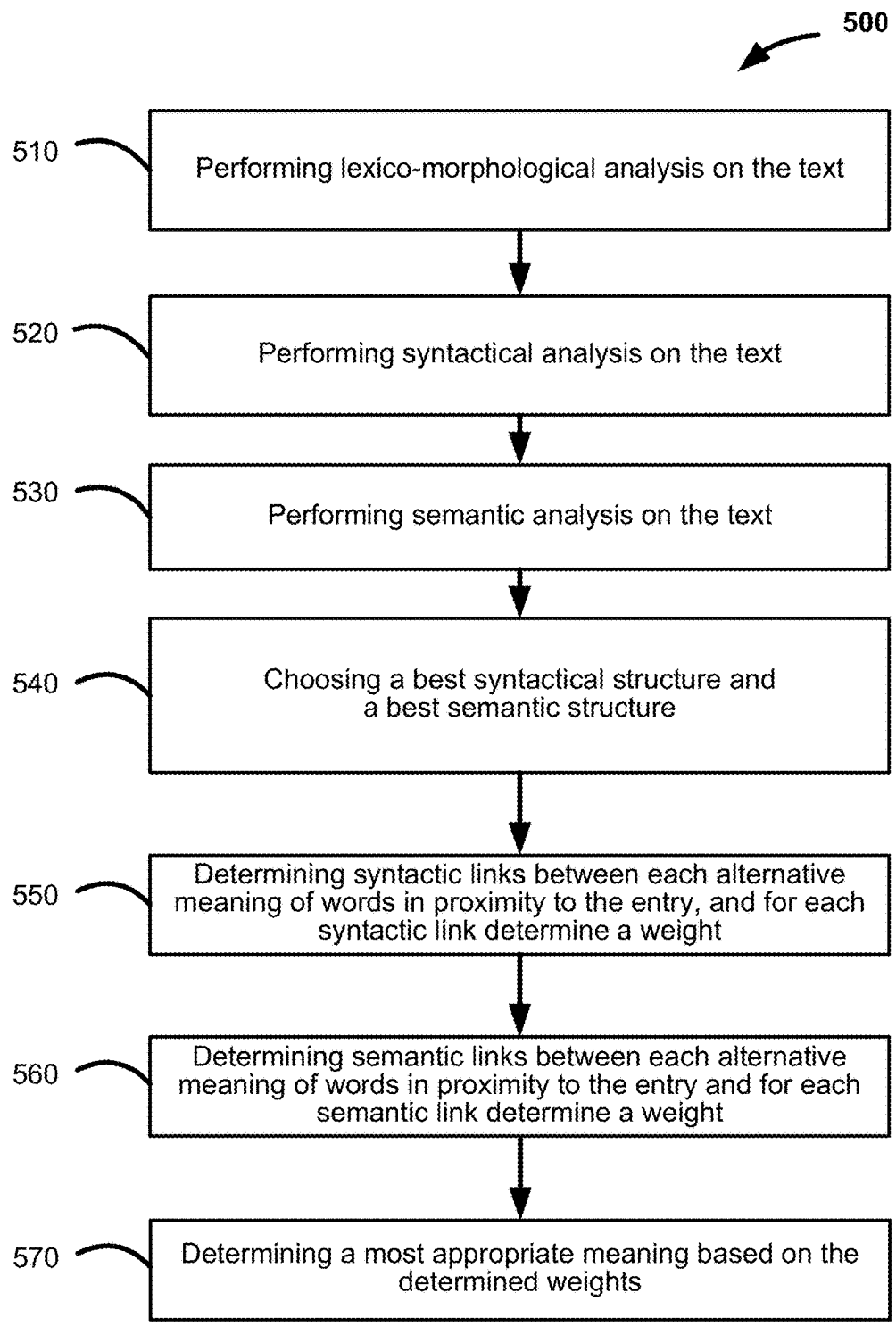
FIG. 5 shows a flowchart of operations for determining word meaning in view of word combination frequency in accordance with an alternative embodiment of the disclosure.

An alternative embodiment of the system comprises a preliminary translation of a text, or translation "on-the-fly" of a part of the text, by a machine translation system, for example as it was disclosed in U.S. Pat. Nos. 8,078450, 8,145473, and 8,214,199. In one example, a proximity of the entry, including, at least, the sentence containing the entry may be selected as the part of the text. FIG. 5 shows a flowchart of operations which are executed for translating the sentence, where the result of translation of the whole sentence by the machine translation system is not shown to a user, but lexical meanings, selected during the process, are saved and selected for determining word meaning and are shown via a graphical user interface to a user when the user is translating the text by himself and needs to see a translation only for a small number of separate words.

FIG. 5 shows the method 500 for providing the most probable meaning of an entry in a text, the method including the steps of: performing syntactical analysis of the sentence of the text (step 520), wherein a syntactical structure of the sentence in the text is generated from the syntactical analysis; performing semantic analysis of the sentence, wherein a semantic structure (step 530) of the sentence is generated from the semantic analysis; determining possible syntactic links between words in proximity to the entry and for each syntactic link determining a weight (step 550); generating semantic structure (step 540), taking into account semantic links between words in proximity to the entry and for each semantic link determining a weight (step 560); and determining the most probable meaning based on lexical selection and the weights of the syntactic and semantic links (step 570).

In one example, the step of performing lexico-morphological analysis of the sentence is performed before the step of performing syntactical analysis of the sentence of the text (step 520). A syntactical structure of the sentence in the text is generated from the syntactical analysis of the sentence and a semantic structure of the sentence is also generated. Linguistic descriptions are used to provide syntactical and semantic analysis. During these analyses a best syntactical structure is chosen. In one example, a best semantic structure is also chosen. Weights are determined from possible syntactic links between words in proximity to the entry and possible semantic links between words in proximity to the entry. In one example, weights are determined by estimating the weight. The most probable meaning is based on lexical selection and the weights of the syntactic and semantic links (step 570).

Semantic analysis includes making a lexical selection for each word in the sentence. After making the lexical selection, the system is programmed to distinguish not only the "words" in the text, but also their specific lexical meanings which belong to certain semantic classes, and also deep semantic relations between the words and the entry. The result of the lexical selection is saved and is used to show to the user the translation—not a word (entry), but the translation of the lexical meaning which was determined during translation process.

To obtain weights of syntactic links and weights of semantic links between lexical meanings, weights which may be used for determining the most probable meaning, the same process may be applied to analyze text corpora. All type of statistics are gathered in this process, for example, frequencies of word and word combinations, ratings of surface slots and ratings of lexical meanings, ratings of deep slots etc. Referring to the embodiment shown in FIG. 5, linguistic descriptions are used to provide syntactical and semantic analysis of text corpora. The analysis comprises several steps for each sentence in the text corpora. A first step (510) includes performing lexico-morphological analysis which includes defining all possible variants of morphological form and lemma for each word in each sentence in the corpora. After that, syntactical analysis is performed (step 520). The syntactical analysis includes: detecting all possible syntactic relations between words in the sentence, building a graph of generalized constituents, applying syntactical models and generating one or more syntactic trees. Then, non-tree links in the syntactical tree are established, and the best syntactic structure is selected (step 540). For each syntactical link, a weight is determined (step 550).

Semantic analysis is performed on the best syntactic structure (step 530). As result of semantic analysis a language-independent semantic structure of the sentence is created which may be used for different purposes, such as machine translation, texts classifying, semantic searching etc. The syntactic structure includes semantic classes and semantic links between them. For each semantic link, a weight is determined (step 560). After the weights of the syntactical links are determined, the most probable meaning of each word in the target language is determined. The weights are saved and may be converted into ratings for using in further translations and analyzing.

For purposes of an electronic dictionary, the analysis of determining the most probable meaning uses the calculation of not only the frequencies (weights) of word combinations, but also the frequencies of lexical meanings and of semantic links between lexical meanings of words in the text. Having the weight values, the ratings of the lexical meanings and the combinations of lexical meanings taking into account semantic links between words in a sentence are calculated and saved (steps 550 and 560). The weight values may be more precise and informative, because in many cases the physical placement of the two neighboring words may be random such that no real semantic relations between lexical meanings may exist.

Figure 6:
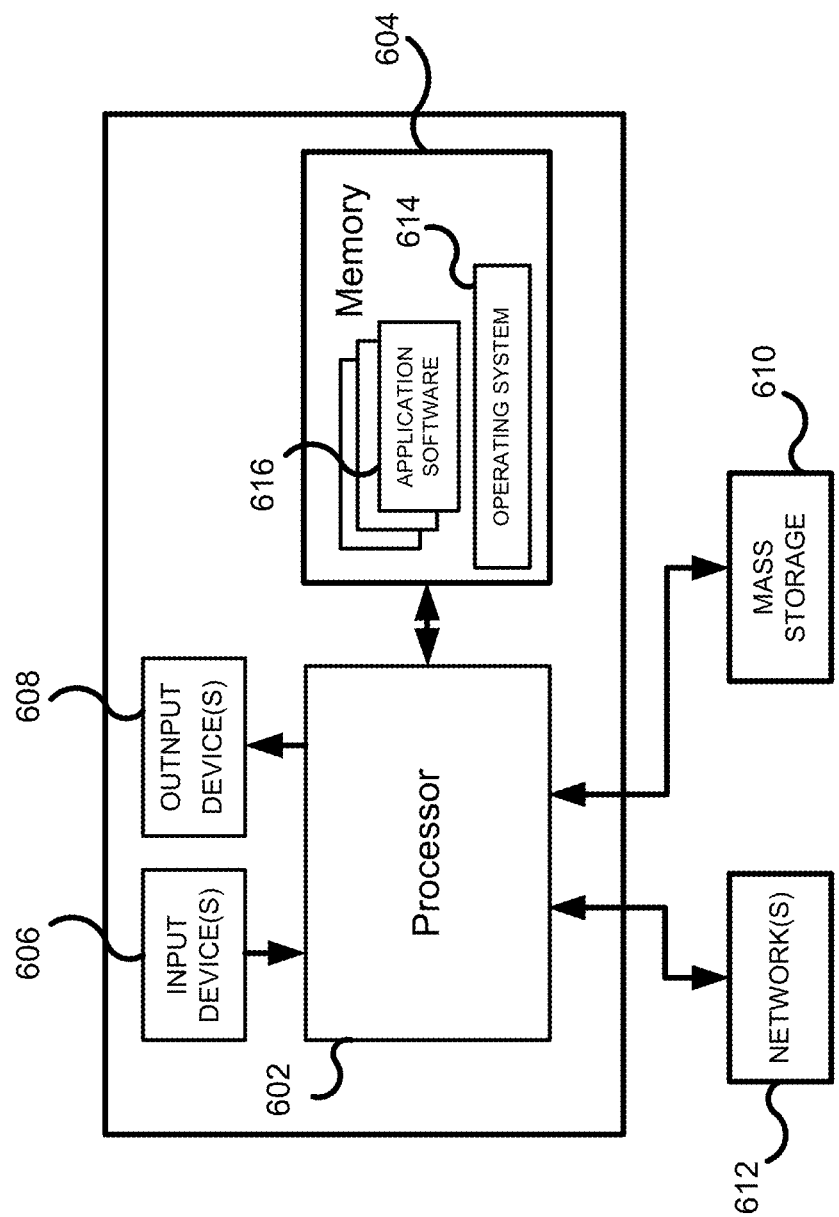
FIG. 6 shows exemplary hardware for implementing a system and performing a method according to the disclosure.

FIG. 6 of the drawings shows hardware 600 that may be used to implement a user electronic device 102 in accordance with one embodiment of the invention in order to translate a word or word combination and to display one or more translations to a user. Referring to FIG. 6, a hardware 600 typically includes at least one processor 602 coupled to a memory 604. The processor 602 may represent one or more processors (e.g. microprocessors), and the memory 604 may represent random access memory (RAM) devices comprising a main storage of the hardware 600 and any supplemental levels of memory, e.g., cache memories, non-volatile or back-up memories (e.g. programmable or flash memories), read-only memories, etc. In addition, the memory 604 may be considered to include memory storage physically located elsewhere in the hardware 600, e.g. any cache memory in the processor 602 and any storage capacity used as a virtual memory, e.g., as stored on a mass storage device 610.

The hardware 600 also typically receives a number of inputs and outputs for communicating information externally. For interfacing with a user or operator, the hardware 600 may include one or more user input devices 606 (e.g., a keyboard, a mouse, imaging device, scanner, etc.) and a one or more output devices 608 (e.g., a Liquid Crystal Display (LCD) panel, a sound playback device (speaker)). To embody some embodiments of the present invention, the hardware 600 must include at least one display or interactive element (for example, a touch screen), an interactive whiteboard or any other device which allows the user to interact with a computer by touching areas on the screen.

For additional storage, the hardware 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 600 may include an interface with one or more networks 612 (e.g., a local area network (LAN), a wide area network (WAN), a wireless network, and/or the Internet among others) to permit the communication of information with other computers coupled to the networks. It should be appreciated that the hardware 600 typically includes suitable analog and/or digital interfaces between the processor 602 and each of the components 604, 606, 608, and 612 as is well known in the art.

The hardware 600 operates under the control of an operating system 614, and executes various computer software applications, components, programs, objects, modules, etc. to implement the techniques described above. In particular, the computer software applications will include the client dictionary application, in the case of the client user device 102. Moreover, various applications, components, programs, objects, etc., collectively indicated by reference 616 in FIG. 6, may also execute on one or more processors in another computer coupled to the hardware 600 via a network 612, e.g. in a distributed computing environment, whereby the processing required to implement the functions of a computer program may be allocated to multiple computers over a network.

In general, the routines executed to implement embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while various embodiments of the invention have been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

In one example, the computer readable medium for storing a program and causing a computer to execute the method, includes the steps of: determining the alternative meanings of an entry; determining words in proximity to the entry; for each word in proximity to the entry, determining the link between the entry and each word in proximity to the entry; for each link between the entry and each word in proximity to the entry, determining a weight associated with each link; and based on the weight associated with each link, determining the appropriate meaning of the entry. In another example, the computer readable medium for storing a program and causing a computer to execute the method, includes the steps of: performing lexico-morphological analysis on the text; performing syntactical analysis on the text; performing semantic analysis on the text; choosing a best syntactical structure and a best semantic structure; determining syntactic links between each alternative meaning of words in proximity to the entry and for each syntactic link determining a weight; determining semantic links between each word in proximity to the entry and for each semantic link determining a weight associated with each link; and based on the weights associated with each semantic and syntactic link, determining the appropriate meaning of the entry.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

What is claimed is:

1. A method comprising:
   performing a lexico-morphological analysis on a sentence, comprising a text entry in a text, for determining one or more meanings of one or more words in proximity to the text entry;
   performing a syntactic analysis on the sentence, wherein the syntactic analysis comprises generating one or more syntactic links and associated weights between the meanings of the words in proximity to the text entry;
   determining, in view of the weights associated with the syntactic links, a first meaning of the text entry; and
   selecting, by one or more processing devices and in view of the determined first meaning of the text entry, a second meaning of the text entry from multiple alternative meanings provided by a dictionary entry of an electronic dictionary, wherein the dictionary entry comprises a dictionary theme for each of the alternative meanings, wherein each dictionary theme identifies one of multiple areas of human knowledge that are represented in a hierarchical structure, wherein the electronic dictionary and the hierarchical structure are stored in an electronic data storage device, and wherein selecting the second meaning comprises:
   associating the first meaning of the text entry with a text theme that identifies one of the areas of human knowledge;
   comparing distances between the text theme and each dictionary theme within the hierarchical structure; and
   selecting, from the alternative meanings, the second meaning that has a shortest distance between the dictionary theme of the second meaning and the text theme from the distances within the hierarchical structure.

2. The method of claim 1, wherein the syntactical analysis comprises:
   building a graph of generalized constituents comprising applying syntactical models; and
   generating at least one syntactic tree for the sentence.

3. The method of claim 2, further comprising generating a syntactic structure with established non-tree links in view of the syntactic tree.

4. The method of claim 3, further comprising performing a semantic analysis of the sentence.

5. The method of claim 4, wherein the semantic analysis comprises determining one or more semantic links between at least one of the meanings of at least one of the words in proximity to the text entry.

6. The method of claim 5, wherein the semantic analysis comprises determining one or more weights associated with the semantic links.

7. The method of claim 6, wherein determining the first meaning of the text entry is further in view of the weights associated with the semantic links.

8. The method of claim 1, wherein the lexico-morphological analysis of the sentence comprises defining possible variants of morphological form and lemma for at least one of the meanings of at least one of the words in proximity to the text entry.

9. The method of claim 1, further comprising:
   selecting a translation variant from among multiple translation variants of the text entry, wherein the translation variants correspond to the alternative meanings, and wherein the translation variant corresponds to the second meaning; and
   displaying the translation variant on a screen of an electronic device.

10. A system comprising:
    one or more electronic data storage devices that store instructions; and one or more processors to execute the stored instructions to:
    perform a lexica-morphological analysis on a sentence, comprising a text entry in a text, for determination of one or more meanings of one or more words in proximity to the text entry;
    perform a syntactic analysis on the sentence, wherein, to perform the syntactic analysis, the processor are to generate one or more syntactic links and associated weights between the meanings of the words in proximity to the text entry;
    determine, in view of the weights associated with the syntactic links, a first meaning of the text entry; and
    select, in view of the determined first meaning of the text entry, a second meaning of the text entry from multiple alternative meanings provided by a dictionary entry of an electronic dictionary, wherein the dictionary entry comprises a dictionary theme for each of the alternative meanings, wherein each dictionary theme identifies one of multiple areas of human knowledge that are represented in a hierarchical structure, wherein the electronic dictionary and the hierarchical structure are stored in an electronic data storage device, and wherein, to select the second meaning, the processors are to:

associate the first meaning of the text entry with a text theme that identifies one of the areas of human knowledge;

compare distances between the text theme and each dictionary theme within the hierarchical structure; and select, from the alternative meanings, the second meaning that has a shortest distance between the dictionary theme of the second meaning and the text theme from the distances within the hierarchical structure.

11. The system of claim 10, wherein, to perform the syntactical analysis, the processors are further to:

build a graph of generalized constituents, wherein, to build the graph, the processors are further to apply syntactical models; and generate at least one syntactic tree for the sentence.

12. The system of claim 11, wherein the processors are further to generate a syntactic structure with established non-tree links in view of the syntactic tree.

13. The system of claim 12, wherein the processors are further to perform a semantic analysis of the sentence.

14. The system of claim 13, wherein, to perform the semantic analysis, the processors are further to determine one or more semantic links between at least one of the meanings of at least one of the words in proximity to the text entry.

15. The system of claim 14, wherein, to perform the semantic analysis, the processors are further to determine one or more weights associated with the semantic links.

16. The system of claim 15, wherein the processors are to determine the first meaning of the text entry further in view of the weights associated with the semantic links.

17. The system of claim 10, wherein, to perform the lexico-morphological analysis of the sentence, the processors are further to define possible variants of morphological form and lemma for at least one of the meanings of at least one of the words in proximity to the text entry.

18. A non-transitory computer-readable storage medium having instructions stored thereon, that when executed by one or more processing devices, cause the processing devices to:

perform a lexico-morphological analysis on a sentence, comprising a text entry in a text, for determination of one or more meanings of one or more words in proximity to the text entry;

perform a syntactic analysis on the sentence, wherein, to perform the syntactic analysis, the instructions are to cause the processing devices to generate one or more syntactic links and associated weights between the meanings of the words in proximity to the text entry;

determine, in view of the weights associated with the syntactic links, a first meaning of the text entry; and select, by the processing devices and in view of the determined first meaning of the text entry, a second meaning of the text entry from multiple alternative meanings provided by a dictionary entry of an electronic dictionary, wherein the dictionary entry comprises a dictionary theme for each of the alternative meanings, wherein each dictionary theme identifies one of multiple areas of human knowledge that are represented in a hierarchical structure, wherein the electronic dictionary and the hierarchical structure are stored in an electronic data storage device, and wherein, to select the second meaning, the instructions are further to cause the processing devices to:

associate the first meaning of the text entry with a text theme that identifies one of the areas of human knowledge;

compare distances between the text theme and each dictionary theme within the hierarchical structure; and select, from the alternative meanings, the second meaning that has a shortest distance between the dictionary theme of the second meaning and the text theme from the distances within the hierarchical structure.

19. The non-transitory computer-readable storage medium of claim 18, wherein, to perform the syntactical analysis, the instructions are further to cause the processing devices to:

build a graph of generalized constituents, wherein, to build the graph, the instructions are further to cause the processing devices to apply syntactical models; and generate at least one syntactic tree for the sentence.

20. The non-transitory computer-readable storage medium of claim 19, wherein the instructions are further to cause the processing devices to generate a syntactic structure with established non-tree links in view of the syntactic tree.

21. The non-transitory computer-readable storage medium of claim 20, wherein the instructions are further to cause the processing devices to perform a semantic analysis of the sentence.

22. The non-transitory computer-readable storage medium of claim 21, wherein, to perform the semantic analysis, the instructions are further to cause the processing devices to determine one or more semantic links between at least one of the meanings of at least one of the words in proximity to the text entry.

23. The non-transitory computer-readable storage medium of claim 22, wherein, to perform the semantic analysis, the instructions are further to cause the processing devices to determine one or more weights associated with the semantic links.

24. The non-transitory computer-readable storage medium of claim 23, wherein the instructions are to cause the processing devices to determine the first meaning of the text entry further in view of the weights associated with the semantic links.

25. The non-transitory computer-readable storage medium of claim 18, wherein, to perform the lexico-morphological analysis of the sentence, the instructions are further to cause the processing devices to define possible variants of morphological form and lemma for at least one of the meanings of at least one of the words in proximity to the text entry.

* * * * *